Sept. 12, 1961 C. W. GEER 2,999,943
SELF-ORIENTING HELIOTROPIC DEVICE
Filed Dec. 8, 1959 2 Sheets-Sheet 1
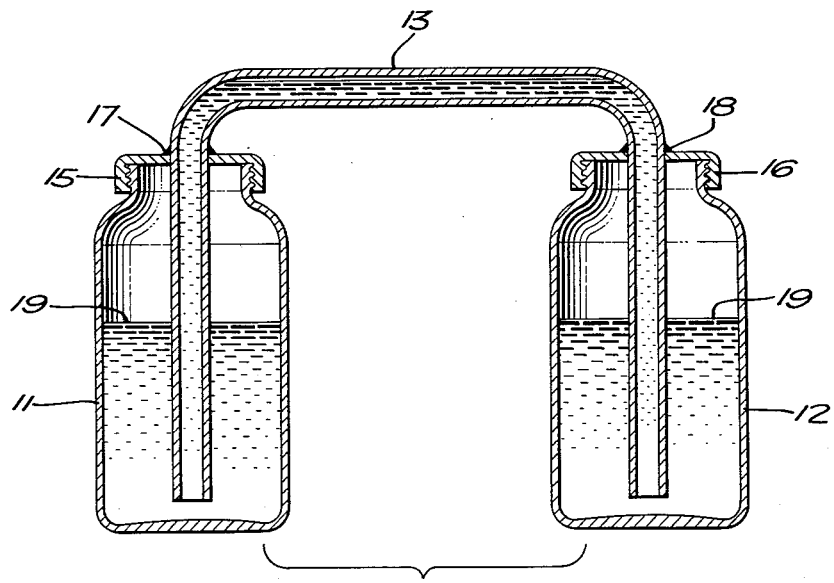
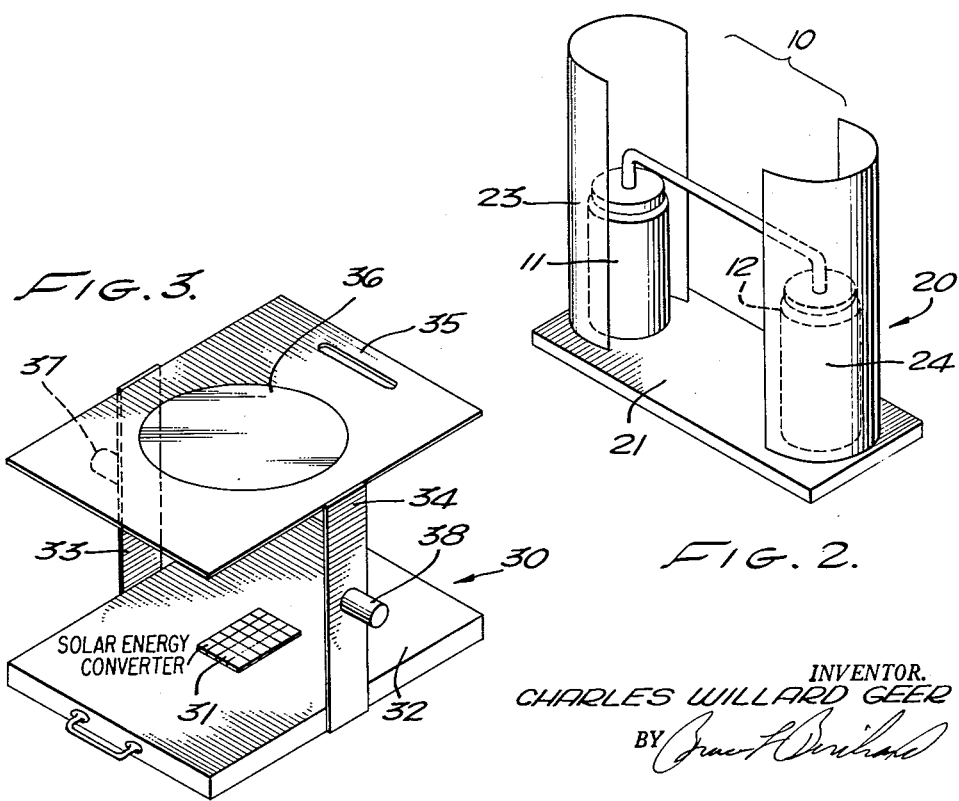
INVENTOR.
CHARLES WILLARD GEER
BY
ATTORNEY Sept. 12, 1961          C. W. GEER          2,999,943
SELF-ORIENTING HELIOTROPIC DEVICE
Filed Dec. 8, 1959                          2 Sheets-Sheet 2

INVENTOR.
CHARLES WILLARD GEER
BY
ATTORNEY

United States Patent Office 2,999,943
Patented Sept. 12, 1961

2,999,943
SELF-ORIENTING HELIOTROPIC DEVICE
Charles Willard Geer, Los Angeles, Calif., assignor to Hoffman Electronics Corporation, a corporation of California
Filed Dec. 8, 1959, Ser. No. 858,150
13 Claims. (Cl. 250—215)

The present invention relates to self-orienting positive heliotropic devices and, more particularly, to such devices which are used to orient converters which transform solar energy into electrical, chemical, mechanical, or thermal energy.

Energy converters have been devised and produced which transform solar energy into various other types of energy. In recent years, silicon photovoltaic converters, sometimes called "solar cells" have become attractive as means for converting solar energy into electrical energy. In order to derive maximum power from a converter panel, it is necessary that the cells making up the panel be positioned in such a manner that they face the sun directly. Since the earth's rotation results in a relative east-west movement of the sun over the surface of the earth, it is necessary that the solar cells be constantly oriented. The need is apparent for a lightweight, inexpensive device, simply constructed, which will track the sun and constantly keep a solar energy converter panel oriented so that the sun's rays strike the converter panel with normal incidence.

Therefore, one of the objects of the present invention is to provide an inexpensive, reliable device, which is simple to construct, and will track the sun thus keeping the associated solar energy converter oriented in such a manner that the sun's rays strike the converter with normal incidence.

Another object of this invention is to provide a device of the type described which operates under its own power and is not dependent on some outside source of power such as a battery, generator, or a portion of the energy transformed by the solar energy converter.

According to the present invention, two closed bottles or containers, each partially filled with a liquid which has a low boiling point, are connected by a tube to form a closed system. Each bottle is mounted and shielded in such a manner that equal amounts of sunlight strike both bottles when the angle of incidence of the sun's rays upon the tops of the bottles is normal. Unequal heating of the two bottles results in a transfer of liquid from the hotter to the cooler bottle and a change in the static balance of the orientation mechanism thus orienting the rotatable support for the bottles in such a manner as to follow the sun. A solar energy converter is rotatably connected to the orientation mechanism in such a manner that as that mechanism follows the sun the solar panel is positioned incrementally and the sun's rays strike the active surface of the converter with normal incidence.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which, FIGURE 1 is a cross sectional view of the mass-transfer portion of the preferred embodiment of the present invention.

FIGURE 2 is a perspective view of the mass-transfer mechanism and associated shields and platform hereinafter all referred to as the orienting mechanism.

FIGURE 3 is a perspective view of the preferred embodiment of a solar energy converter unit.

Figure 4:
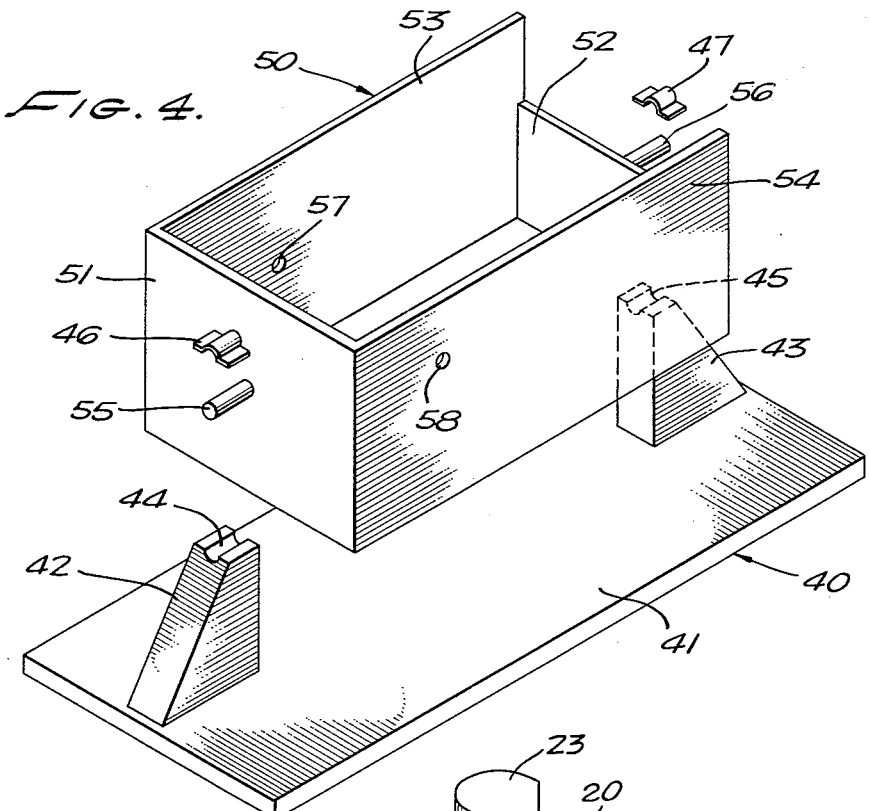
FIGURE 4 is an exploded perspective of the support mechanism therefor.

As seen in FIGURE 1, mass-transfer mechanism 10 comprises containers 11 and 12 connected by tube 13 which extends into each container to the lower portion thereof. Containers 11 and 12 are sealed by caps 15 and 16, respectively, each of which has a hole in its center to permit the insertion of tube 13. Solder connections 17 and 18 seal and hold tube 13 in caps 15 and 16, respectively. A predetermined quantity of liquid 19, such as ethyl chloride having a low boiling point, is confined in containers 11 and 12 and tube 13. As it is desirable that liquid 19 be dark in color in order to have a large light absorption coefficient, a dye should be added to the ethyl chloride to darken it.

As seen in FIGURE 2, orienting mechanism 20 comprises mass-transfer mechanism 10, with associated containers 11 and 12 attached to platform 21, and associated shields 23 and 24, which are hemicylindrical and have highly reflective inner surfaces. Shields 23 and 24 are attached to platform 21 adjacent containers 11 and 12, respectively.

In FIGURE 3, solar energy converter unit 30 comprises converter panel 31, support platforms 32 and 35, supports 33 and 34, condensing lens 36 and rotation pins 37 and 38. Platform 32 is made of a thick sheet of aluminum to conduct the heat from the concentrated sunlight away from converter panel 31, to prevent overheating.

In FIGURE 4, support mechanism 40 comprises base platform 41 to which are attached supports 42 and 43. On the supper surfaces of supports 42 and 43 are grooves 44 and 45 respectively, into which fit rotation pins 55 and 56, respectively. These pins are held in place by plates 46 and 47, respectively. Orienting mechanism support 50 comprises sides 51, 52, 53 and 54. Rotation pins 55 and 56 are attached to sides 51 and 52, respectively, and are normal thereto. Holes 57 and 58 are so placed in sides 53 and 54 as to permit the insertion of rotating pins 37 and 38, respectively.

Figure 5:
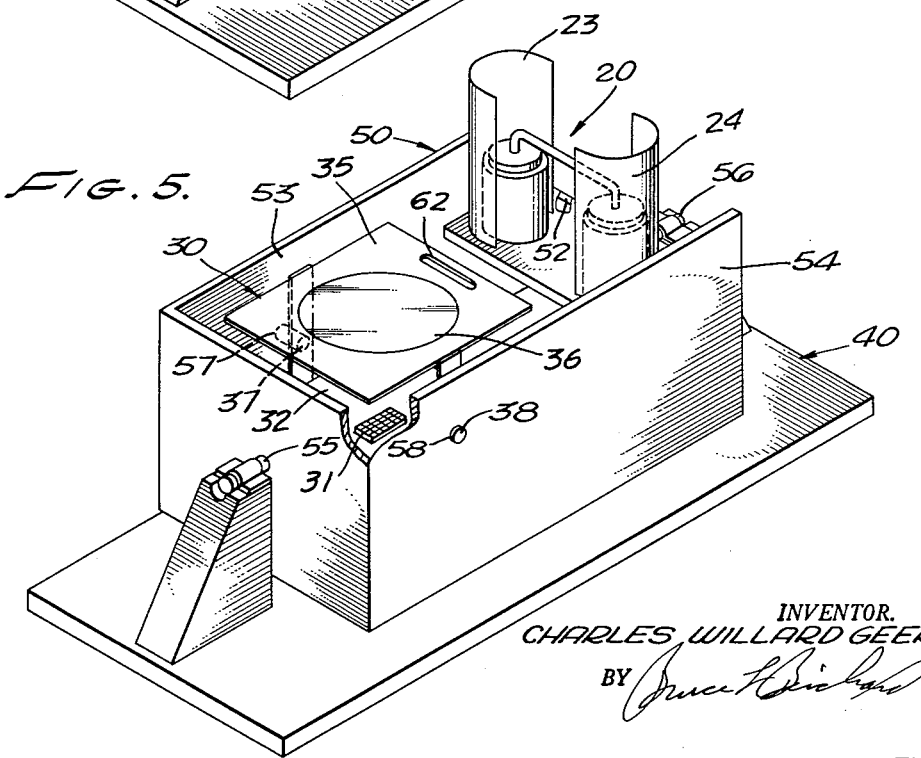
FIGURE 5 is a perspective view of the assembled preferred embodiment of the present invention.

In FIGURE 5 orienting mechanism 20 is attached to support mechanism 50. Solar energy converter unit 30 is rotatably attached to support means 50 and support means 50 is rotatably attached to support means 40.

The apparatus of FIGURES 1–5 is assembled and operates as follows. Transparent glass container 11 is completely filled with liquid 19. Copper tube 13 is inserted through screw-type caps 15 and 16 and soldered in place by solder connections 17 and 18, respectively, in such a manner as to create an air-tight seal. Tube 13 is then inserted into container 11 and cap 15 is so attached to container 11 as to create an air-tight seal. A small quantity of liquid 19 is placed in transparent glass container 12. The remaining open end of tube 13 is held over container 12 and heat is applied to container 11. The heat causes a quantity of liquid 19 to vaporize in container 11 and the resulting vapor pressure drives liquid 19 through tube 13 into container 12. As soon as container 12 is completely filled with liquid 19, cap 16 is fastened in place upon container 12 so as to create an air-tight seal and container 11 and the remaining liquid 19 therein are cooled to the same temperature as container 12 and the liquid 19 therein. The result of this first assembly step is that when containers 11 and 12 are at the same temperature, there is an equal amount of liquid 19 and vapor therefrom in each of the two containers 11 and 12 and tube 13 is filled with liquid 19. Further, when one of the containers is heated to a higher temperature than the other there is increased vapor pressure in the hotter container which results in a transfer of a portion of liquid 19 to the cooler container, a decrease of mass in the hotter container and an increase of mass in the cooler container.

Mass transfer mechanism 10 with associated containers 11 and 12 are attached to platform 21 so that the lower surfaces of containers 11 and 12 rest upon the upper surface of platform 21. Shields 23 and 24 are made of tin sheet metal and are mounted upon platform 21 perpendicular thereto and adjacent containers 11 and 12, respectively. Shields 23 and 24 are hemicylindrical, for example, and are positioned in such a manner that when solar energy strikes platform 21 with normal incidence containers 11 and 12 are insolated equally, and when solar energy is incident upon platform 21 in other than a normal manner, the shields allow a greater amount of sunlight to strike that container which is farthest from the sun and a lesser amount of sunlight to strike that container which is closest to the sun, resulting in unequal heating of the two containers. Furthermore, each container is positioned at the focal point of its respective shield, so that the container farthest from the sun will receive the additional sunlight that is reflected inward from its shield.

Solar energy converter panel 31 is attached to the center of the upper surface of support platform 32. Supports 33 and 34 are attached at their lower extremities to support platform 32. At the upper extremity of supports 33 and 34 is attached support platform 35 which is on a plane parallel to support platform 32. Support platform 35 holds condensing lens 36 in such a position that when the sun's rays strike lens 36 with normal incidence the condensed sunlight falls equally over the active surface of solar energy converter panel 31. Rotation pins 37 and 38 are attached to supports 33 and 34 on an axis passing through the center of gravity of unit 30.

Sides 51, 52, 53 and 54 are permanently connected so as to form a rectangle. Rotating pins 55 and 56 are attached to sides 51 and 52 respectively and placed in grooves 44 and 45 respectively. Plates 46 and 47 are then attached to the upper surfaces of supports 42 and 43 thus locking support mechanism 50 to support mechanism 40 in such a way as to permit support mechanism 50 to be rotated upon the axis formed by pins 55 and 56.

Orienting mechanism 20 is positioned upon the upper surface of side 52 between sides 53 and 54 and permanently attached thereto.

Solar energy converter unit 30 is inserted between sides 53 and 54 and rotation pins 37 and 38 are inserted in holes 57 and 58. Thus, solar energy converter unit 30 may be rotated upon an axis formed by rotation pins 37 and 38, such axis being perpendicular to the axis formed by pins 55 and 56.

The entire mechanism is so positioned that the axis formed by pins 55 and 56 is parallel to the polar axis of the earth, enabling converter unit 30 and orienting mechanism 20 to follow the sun during the day as the earth rotates. Daily orientation is accomplished by orienting mechanism 20 as a result of changes in the static balance of the mechanism which result when the sun's rays strike the tops of containers 11 and 12 at an angle other than 90°. Seasonal orientation is made by manually rotating solar energy converter unit 30 by means of either handle 61 or handle 62 upon the axis formed by pins 37 and 38. Thus, daily and seasonal tracking of the sun are effected.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A positive heliotropic device including a temperature differential sensing mechanism having a plurality of containers which are tubularly connected and sealed so as to form a closed system, said system containing a predetermined quantity of liquid which has a low boiling point; a shield supported adjacent each container and movable in concert therewith, said shields being so proportioned and positioned that when said containers and a source of radiant energy are in a predetermined relation, said containers are equally insulated, and when not in said predetermined relation, said shields allow a greater amount of radiant enery to strike those of said containers most distant from said source and a lesser amount to strike those of said containers less distant from said source, thereby producing a temperature differential between said containers; and support means rotatably connected to said mechanism whereby said temperature differential between said containers results in a transfer of liquid to the cooler container thus causing a change in the static balance of said mechanism and rotation thereof with respect to said support until said temperature differential is eliminated.

2. A device according to claim 1 wherein a solar energy converter panel is coupled to said mechanism and is movable in concert therewith.

3. A device according to claim 2 wherein said solar energy converter panel is rotatably connected to said mechanism and including means for manual adjustment of said converter panel for seasonal changes in the position of the sun.

4. A device according to claim 1 wherein each of said shields is hemicylindrical in shape, and has concave and convex surfaces.

5. A device according to claim 1 wherein the major portion of each of said containers is of a transparent material.

6. A device according to claim 1 wherein each of said shields has a highly reflective surface which faces its respective container.

7. A device according to claim 4 wherein the concave surfaces of said shields are highly reflective.

8. A device according to claim 1 wherein said liquid is dark in color.

9. A device according to claim 1 in which said containers are cylindrical in shape and the axis of each of said shields is substantially parallel to the axis of its associated container.

10. A device according to claim 1 in which the number of said containers is two.

11. A device according to claim 1 in which each of said shields is curved in shape.

12. A device according to claim 5 wherein said liquid is dark in color.

13. A device according to claim 1 in which said shields are hemicylindrical in shape, said containers are cylindrical in shape and positioned at the focal point of their respective shields so that the containers farther from the sun will receive the additional radiant energy that is reflected inward from said shields.

References Cited in the file of this patent
UNITED STATES PATENTS

| | | |
|---|---|---|
| 1,055,439 | Anderson | Mar. 11, 1913 |
| 1,911,426 | Brodie | May 30, 1933 |
| 1,911,456 | Lyon | May 30, 1933 |
| 2,187,124 | Harmon | Jan. 16, 1940 |